United States Patent
Kondo et al.

(10) Patent No.: US 8,620,663 B2
(45) Date of Patent: Dec. 31, 2013

(54) SPEECH SYNTHESIS SYSTEM FOR GENERATING SPEECH INFORMATION OBTAINED BY CONVERTING TEXT INTO SPEECH

(75) Inventors: Reishi Kondo, Tokyo (JP); Masanori Kato, Tokyo (JP); Yasuyuki Mitsui, Tokyo (JP)

(73) Assignee: NEC Corporation, Tokyo (JP)

( * ) Notice: Subject to any disclaimer, the term of this patent is extended or adjusted under 35 U.S.C. 154(b) by 396 days.

(21) Appl. No.: 13/000,340

(22) PCT Filed: Jun. 22, 2009

(86) PCT No.: PCT/JP2009/002814
§ 371 (c)(1),
(2), (4) Date: Dec. 20, 2010

(87) PCT Pub. No.: WO2010/018648
PCT Pub. Date: Feb. 18, 2010

(65) Prior Publication Data
US 2011/0137655 A1 Jun. 9, 2011

(30) Foreign Application Priority Data
Aug. 13, 2008 (JP) ................................. 2008-208289

(51) Int. Cl.
*G10L 13/08* (2013.01)
(52) U.S. Cl.
USPC ......................................................... 704/260
(58) Field of Classification Search
USPC ......................................................... 704/260
See application file for complete search history.

(56) References Cited

U.S. PATENT DOCUMENTS

| | | | | |
|---|---|---|---|---|
| 6,601,029 | B1 * | 7/2003 | Pickering | 704/257 |
| 6,970,935 | B1 * | 11/2005 | Maes | 709/230 |
| 7,099,826 | B2 * | 8/2006 | Akabane et al. | 704/260 |
| 7,203,648 | B1 * | 4/2007 | Ostermann et al. | 704/260 |
| 7,523,036 | B2 * | 4/2009 | Akabane et al. | 704/260 |
| 2002/0107918 | A1 * | 8/2002 | Shaffer et al. | 709/203 |
| 2003/0161298 | A1 * | 8/2003 | Bergman et al. | 370/352 |
| 2004/0122668 | A1 * | 6/2004 | Marino et al. | 704/249 |
| 2006/0074688 | A1 * | 4/2006 | Cosatto et al. | 704/275 |
| 2007/0112570 | A1 * | 5/2007 | Kaneyasu | 704/260 |

FOREIGN PATENT DOCUMENTS

| | | |
|---|---|---|
| JP | 3240691 B | 12/2001 |
| JP | 3344487 B | 11/2002 |
| JP | 3379643 B | 2/2003 |

(Continued)

OTHER PUBLICATIONS

International Search Report for PCT/JP2009/002814 mailed Jul. 21, 2009.

*Primary Examiner* — Michael N Opsasnick

(57) ABSTRACT

A speech synthesis system includes a server device and a client device. The server device stores speech element information and speech element identification information in association with each other so that, in a case that speech element information representing respective speech elements included in speech uttered by a speech registering user are arranged in the order of arrangement of the speech elements in the speech, at least one of speech element identification information identifying the respective speech element information has different information from information arranged in accordance with a predetermined rule. The client device transmits speech element identification information to the server device based on accepted text information. The client device executes a speech synthesis process based on the speech element information received from the server device.

22 Claims, 12 Drawing Sheets

(56) References Cited

FOREIGN PATENT DOCUMENTS

| | | | |
|---|---|---|---|
| JP | 2003233386 A | 8/2003 |
| JP | 3518340 B | 4/2004 |
| JP | 2004185074 A | 7/2004 |
| JP | 2006322962 A | 11/2006 |
| WO | 2007141993 A | 12/2007 |

* cited by examiner

Fig.2

| SPEECH ELEMENT SPECIFICATION INFORMATION ||||| SPEECH ELEMENT IDENTIFICATION INFORMATION |
|---|---|---|---|---|---|
| PHONEME | CENTRAL PITCH | TEMPORAL LENGTH | ... ||
| a | 200Hz | 30msec | ... | | 3 |
| a | 180Hz | 25msec | ... | | 25 |
| ka | 190Hz | 35msec | ... | | 43 |
| ka | 240Hz | 28msec | ... | | 7 |
| ... | ... | ... | ... | | ... |

Fig.3
| SPEECH ELEMENT IDENTIFICATION INFORMATION | SPEECH ELEMENT INFORMATION |
|---|---|
| 14 |  |
| 3 |  |
| 26 |  |
| 7 |  |
| 4 |  |
| 15 | 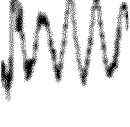 |
| ⋮ | ⋮ |

Fig.10
| SPEECH ELEMENT IDENTIFICATION INFORMATION | LOW-SOUND-QUALITY SPEECH ELEMENT INFORMATION | HIGH-SOUND-QUALITY SPEECH ELEMENT INFORMATION |
|---|---|---|
| 14 | 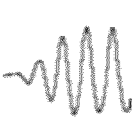 |  |
| 3 | 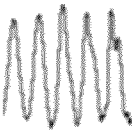 |  |
| 26 |  |  |
| 7 |  |  |
| 4 |  |  |
| 15 | 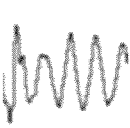 |  |
| ⋮ | ⋮ | ⋮ |

SPEECH SYNTHESIS SYSTEM FOR GENERATING SPEECH INFORMATION OBTAINED BY CONVERTING TEXT INTO SPEECH

The present invention is the National Phase of PCT/JP2009/002814, filed Jun. 22, 2009, which enjoys the benefit of priority from Japanese patent application No. 2008-208289, filed on Aug. 13, 2008, the disclosure of which is incorporated in this specification in its entirety.

TECHNICAL FIELD

The present invention relates to a speech synthesis system that executes a speech synthesis process by communication between a server device and a client device.

BACKGROUND ART

There is a known speech synthesis system that includes a server device configured to store speech element information representing respective speech elements included in speech uttered by a user (a speech registering user) and a client device configured to generate speech information obtained by converting text into speech based on text information representing the text (i.e., execute a speech synthesis process) (refer to Patent Document 1).

This client device generates speech element specification information (for example, information representing a phoneme and a prosody) that specifies a speech element based on inputted text information. Then, the client device transmits the generated speech element specification information to the server device.

The server device previously stores speech element information and speech element specification information in association with each other. The server device transmits speech element information stored in association with the speech element specification information received from the client device, to the client device. Then, the client device executes a speech synthesis process based on the speech element information received from the server device.

According to this speech synthesis system, the client device does not need to store speech element information, and it is therefore possible to ensure a large storage region that can be used by the client device.

[Patent document 1] JP2003-233386 A

In order to reduce the amount of information transmitted from the client device to the server device, it is considered to be favorable that the client device transmits not speech element specification information but speech element identification information representing an integer for identifying a speech element.

In this case, for example, the speech synthesis system is configured so that the client device previously stores speech element specification information and speech element identification information in association with each other and the server device previously stores speech element identification information and speech element information in association with each other.

In this case, it is assumed that the server device stores speech element identification information and speech element information in association with each other so that integers represented by the speech element identification information are integers increased by one in the order of arrangement of speech elements in speech. In this case, when a client device used by a fraudulent user transmits a plurality of integers increased by one (i.e., consecutive integers), the server device transmits a portion including consecutive speech elements in the speech to the client device in a state that the order of arrangement of the speech elements in the speech is maintained.

Accordingly, in such a case, there has been a problem that it is relatively highly possible that the portion including the consecutive speech elements in the speech uttered by the speech registering user is acquired by the fraudulent user. If the speech is acquired by the fraudulent user, there is a fear that, for example, in an authentication process by voice (a voice authentication process), the acquired speech is used and the fraudulent user is thereby recognized as the speech registering user.

SUMMARY

Accordingly, an object of the present invention is to provide a speech synthesis system capable of solving the aforementioned problem that it is relatively highly possible that the portion including the consecutive speech elements in the speech uttered by the speech registering user is acquired by the fraudulent user.

In order to achieve the abovementioned object, a speech synthesis system of an embodiment of the present invention is a system including a server device and a client device connected so as to be capable of communicating with each other.

Further, the server device includes: a speech element information storing unit configured to store speech element information and speech element identification information in association with each other so that, in a case that speech element information representing respective speech elements included in speech uttered by a speech registering user are arranged in the order of arrangement of the speech elements in the speech, at least one of the speech element identification information identifying the respective speech element information has different information from information arranged in accordance with a predetermined rule; a speech-element-identification-information receiving unit configured to receive the speech element identification information from the client device; and a speech element information transmitting unit configured to transmit speech element information stored in association with the received speech element identification information to the client device.

Further, the client device includes: a speech-element-identification-information storing unit configured to store speech element specification information specifying a speech element and the speech element identification information in association with each other; a text information accepting unit configured to accept text information representing text; a speech-element-identification-information transmitting unit configured to generate speech element specification information based on the accepted text information, and transmit speech element identification information stored in association with the generated speech element specification information, to the server device; and a speech synthesizing unit configured to receive speech element information from the server device and, based on the received speech element information, generate speech information obtained by converting text represented by the accepted text information into speech.

Further, a speech element providing device of another embodiment of the present invention includes: a speech element information storing unit configured to store speech element information and speech element identification information in association with each other so that, in a case that speech element information representing respective speech elements included in speech uttered by a speech registering user are arranged in the order of arrangement of the speech elements in the speech, at least one of speech element identification information identifying the respective speech element information has different information from information arranged in accordance with a predetermined rule; a speech-element-identification-information receiving unit configured to receive the speech element identification information; and a speech element information transmitting unit configured to transmit speech element information stored in the storing device in association with the received speech element identification information.

Further, a speech element providing method of another embodiment of the present invention is a method of causing a storing device to store speech element information and speech element identification information in association with each other so that, in a case that speech element information representing respective speech elements included in speech uttered by a speech registering user are arranged in the order of arrangement of the speech elements in the speech, at least one of speech element identification information identifying the respective speech element information has different information from information arranged in accordance with a predetermined rule; receiving the speech element identification information; and transmitting speech element information stored in the storing device in association with the received speech element identification information.

Further, a speech element providing program product of another embodiment of the present invention is a program product comprising computer implementable instructions for causing a speech element providing device including a storing device, to realize: a speech element-information storing process unit configured to cause the storing device to store speech element information and speech element identification information in association with each other so that, in a case that speech element information representing respective speech elements included in speech uttered by a speech registering user are arranged in the order of arrangement of the speech elements in the speech, at least one of speech element identification information identifying the respective speech element information has different information from information arranged in accordance with a predetermined rule; a speech-element-identification-information receiving unit configured to receive the speech element identification information; and a speech element information transmitting unit configured to transmit speech element information stored in the storing device in association with the received speech element identification information.

Further, a speech synthesis method of another embodiment of the present invention is applied to a speech synthesis system including a server device and a client device connected so as to be capable of communicating with each other, the method including: accepting text information representing text, by the client device; generating speech element specification information specifying a speech element, based on the accepted text information, by the client device; transmitting, to the server device by the client device, speech element identification information stored in association with the generated speech element specification information in a storing device configured to store speech element identification information identifying speech element information representing a speech element and speech element specification information specifying a speech element in association with each other, the storing device being included by the client device; receiving the speech element identification information from the client device, by the server device; transmitting, to the client device by the server device, speech element information stored in association with the received speech element identification information in a storing device configured to store speech element information and speech element identification information in association with each other so that, in a case that speech element information representing respective speech elements included in speech uttered by a speech registering user, at least one of the speech element identification information identifying the respective speech element information has different information from information arranged in accordance with a predetermined rule, the storing device being included by the server device; and receiving the speech element information from the server device and, based on the received speech element information, generate speech information obtained by converting text represented by the accepted text information into speech, by the client device.

Further, a client device of another embodiment of the present invention is a device connected to a server device so as to be capable of communicating therewith.

Further, this client device includes: a speech-element-identification-information storing unit configured to store speech element identification information and speech element specification information in association with each other, the speech element identification information being set so that, in a case that speech element information representing respective speech elements included in speech uttered by a speech registering user are arranged in the order of arrangement of the speech elements in the speech, at least one of speech element identification information identifying the respective speech element information has different information from information arranged in accordance with a predetermined rule, and the speech element specification information specifying a speech element; a text information accepting unit configured to accept text information representing text; a speech-element-identification-information transmitting unit configured to generate speech element specification information based on the accepted text information and transmit, to the server device, speech element identification information stored in association with the generated speech element specification information; and a speech synthesizing unit configured to receive speech element information from the server device and, based on the received speech element information, generate speech information obtained by converting text represented by the accepted text information into speech.

Further, a speech synthesis program product of another embodiment of the present invention is a speech synthesis program product comprising computer implementable instructions for causing a client device connected to a server device so as to be capable of communicating therewith, to realize: a text information accepting unit configured to accept text information representing text; a speech-element-identification-information transmitting unit configured to generate speech element identification information based on the accepted text information, and transmit, to the server device, speech element identification information stored in association with the generated speech element specification information in a storing device configured to store speech element identification information and speech element specification information, the speech element identification information being set so that, in a case that speech element information representing respective speech elements included in speech uttered by a speech registering user are arranged in the order of arrangement of the speech elements in the speech, at least one of speech element identification information identifying the respective speech element information has different information from information arranged in accordance with a predetermined rule, and the speech element specification information specifying a speech element; and a speech synthesizing unit configured to receive speech element information from the server device and, based on the received speech element information, generate speech information obtained by converting text represented by the accepted text information into speech.

With the abovementioned configurations, the present invention enables reduction of the possibility that the portion including the consecutive speech elements in the speech uttered by the speech registering user is acquired by the fraudulent user.

BRIEF DESCRIPTION OF THE DRAWINGS

FIG. 2 is a view showing a table stored in a storing device of a client device shown in FIG. 1, which is a table that speech element specification information and speech element identification information are associated with each other;

FIG. 3 is a view showing a table stored in a storing device of a server device shown in FIG. 1, which is a table that speech element identification information and speech element information are associated with each other;

FIG. 10 is a view showing a table stored in a storing device of a server device shown in FIG. 9, which is a table that speech element identification information, low-sound-quality speech element information and high-sound-quality speech element information are associated;

EXEMPLARY EMBODIMENT

Below, respective embodiments of a speech synthesis system, a speech element providing device, a speech element providing method, a speech element providing program product, a speech synthesis method, a client device and a speech synthesis program product according to the present invention will be described with reference to FIGS. 1 to 12.

First Exemplary Embodiment

Figure 1:
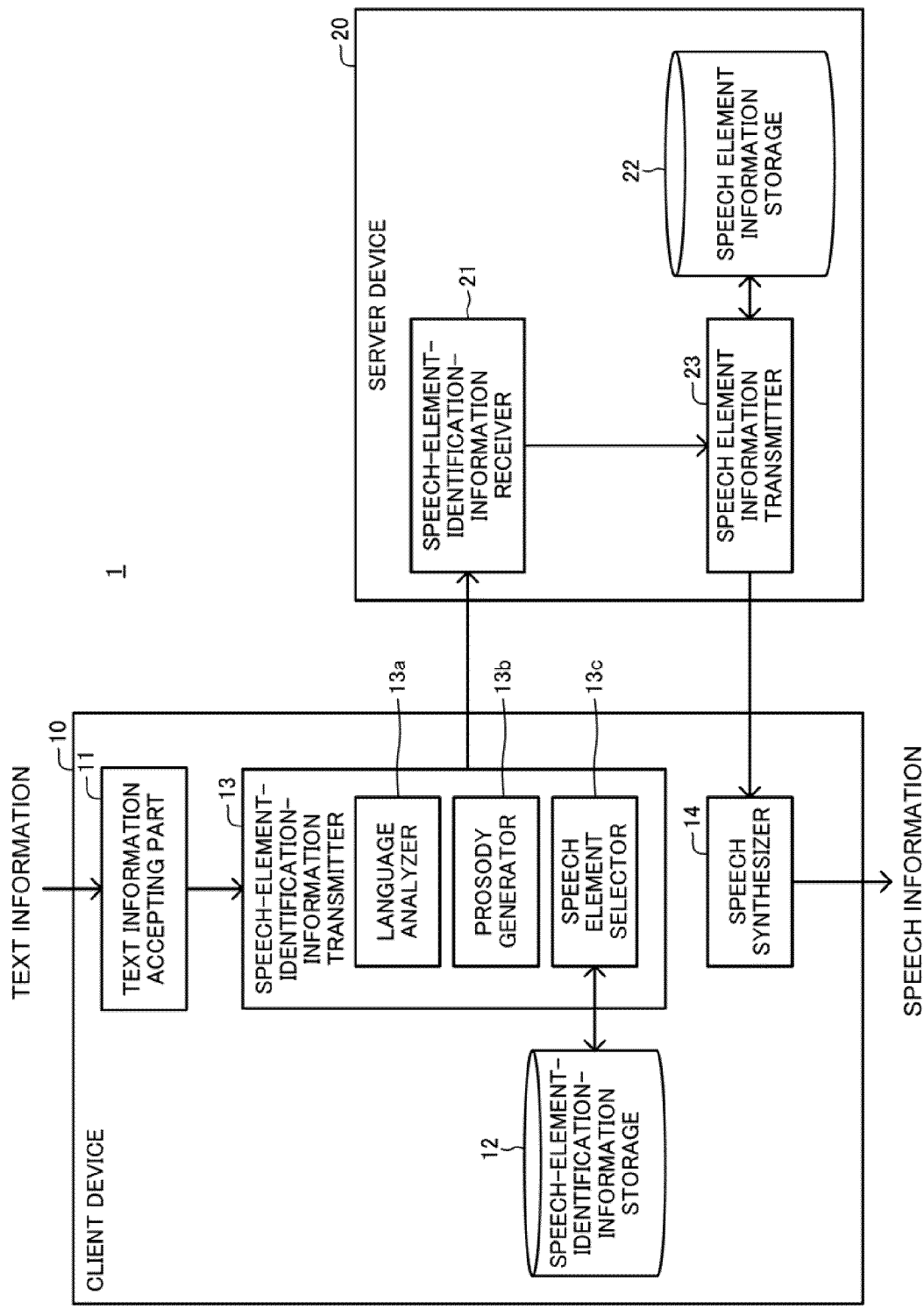
FIG. 1 is a block diagram schematically showing the function of a speech synthesis system according to a first embodiment of the present invention.

As shown in FIG. 1, a speech synthesis system 1 according to a first embodiment includes a client device 10 and a server device 20. The client device 10 and the server device (a speech element providing device) 20 are connected so as to be capable of communicating with each other via a communication line (the Internet in this embodiment) that is not shown in the drawings.

The client device 10 is provided with a central processing unit (CPU), a storing device (a memory and a hard disk drive (HDD)), an input device (a mouse and a keyboard) and an output device (a display and a speaker), which are not shown in the drawings.

The client device 10 is configured so as to realize a function described later through execution by the CPU of a program stored in the storing device. Moreover, the client device 10 accepts text information inputted by a user via the keyboard. The text information is information representing text. Besides, the client device 10 causes the display to display an image including text. Moreover, the client device 10 causes the speaker to output speech.

In a like manner as the client device 10, the server device 20 is provided with a central processing unit, a storing device, an input device and an output device, which are not shown in the drawings. The server device 20 is configured to realize a function described later through execution by the CPU of a program stored in the storing device, in a like manner as the client device 10.

Furthermore, as shown in FIG. 1, the function of the client device 10 includes a text information accepting part (a text information accepting unit) 11, a speech-element-identification-information storage (a speech-element-identification-information storing unit, a speech-element-identification-information storing process unit) 12, a speech-element-identification-information transmitter (a speech-element-identification-information transmitting unit) 13, and a speech synthesizer (a speech synthesizing unit) 14.

The text information accepting part 11 accepts text information inputted by a user.

The speech-element-identification-information storage 12 causes the storing device of the client device 10 to store speech element specification information that specifies a speech element and speech element identification information that identifies speech element information in association with each other as shown in FIG. 2.

In this embodiment, a speech element is a syllable. A speech element may be a diphone. A diphone is, for example, a phone composed of a consonant and a vowel (for example, /ka/) and a phone composed of a vowel and a vowel (for example, /ai/).

Speech element specification information includes phoneme information representing a phoneme (a phonetic symbol) and prosody information representing a prosody (a pitch pattern (a central pitch or the like), a temporal length). Speech element identification information is information representing an integer varying by speech element information as described later.

The speech-element-identification-information transmitter 13 includes a language analyzer 13a, a prosody generator 13b, and a speech element selector 13c.

The language analyzer 13a executes a language analysis process on text represented by the text information accepted by the text information accepting part 11 to generate a phoneme string and an accent. The language analysis process includes a process of analyzing the relation (the modification) of terms, categories and so on, and a process of specifying the position of the accent in text. An example of the language analysis process is disclosed in Japanese Patent Publications Nos. 3379643 and 3518340, and so on.

The prosody generator 13b generates prosody information based on the phoneme string and accent generated by the language analyzer 13a. The prosody information is information associated with each phoneme included in the phoneme string, which is information representing a prosody. A prosody represents the height and length of a phone (i.e., a pitch pattern (a central pitch (average F0), inclination of F0 and so on) and a temporal length), and so on. An example of a process of generating the prosody information is disclosed in Japanese Patent Publications Nos. 3240691 and 3344487.

The speech element selector 13c selects a phoneme included in the phoneme string generated by the language analyzer 13a in order from the beginning of the phoneme string for each speech element. The speech element selector 13c extracts speech element specification information including phoneme information representing the selected phoneme, from among speech element specification information stored in the storing device by the speech-element-identification-information storage 12.

The speech element selector 13c determines speech element specification information including prosody information that is the closest to the prosody information generated by the prosody generator 13b, from among the extracted speech element specification information. Then, the speech element selector 13c acquires speech element identification information stored in association with the determined speech element specification information.

The speech-element-identification-information transmitter 13 transmits the speech element identification information acquired by the speech element selector 13c, to the server device 20.

The speech synthesizer 14 receives speech element information from the server device 20. The speech synthesizer 14 converts prosodies of speech elements represented by the speech element information, based on the received speech element information and the phoneme string and prosody information generated by the speech-element-identification-information transmitter 13.

Then, the speech synthesizer 14 connects the converted speech elements, thereby generating speech information obtained by converting text represented by the text information accepted by the text information accepting part 11 into speech (i.e., executes a speech synthesis process).

Next, the client device 10 outputs the speech represented by the speech information generated by the speech synthesizer 14, from the speaker.

On the other hand, the function of the server device 20 includes a speech-element-identification-information receiver (a speech-element-identification-information receiving unit) 21, a speech element information storage (a speech element information storing unit) 22, and a speech element information transmitter (a speech element information transmitting unit) 23.

The speech-element-identification-information receiver 21 receives speech element identification information transmitted by the client device 10.

The speech element information storage 22 accepts speech information representing speech uttered by a speech registering user. The speech element information storage 22 divides the speech represented by the accepted speech information into speech elements, thereby generating speech element information representing the respective speech elements. The speech element information storage 22 causes the storing device of the server device 20 to store the generated speech element information and the speech element identification information representing integers in association with each other one to one as shown in FIG. 3.

Figure 4:
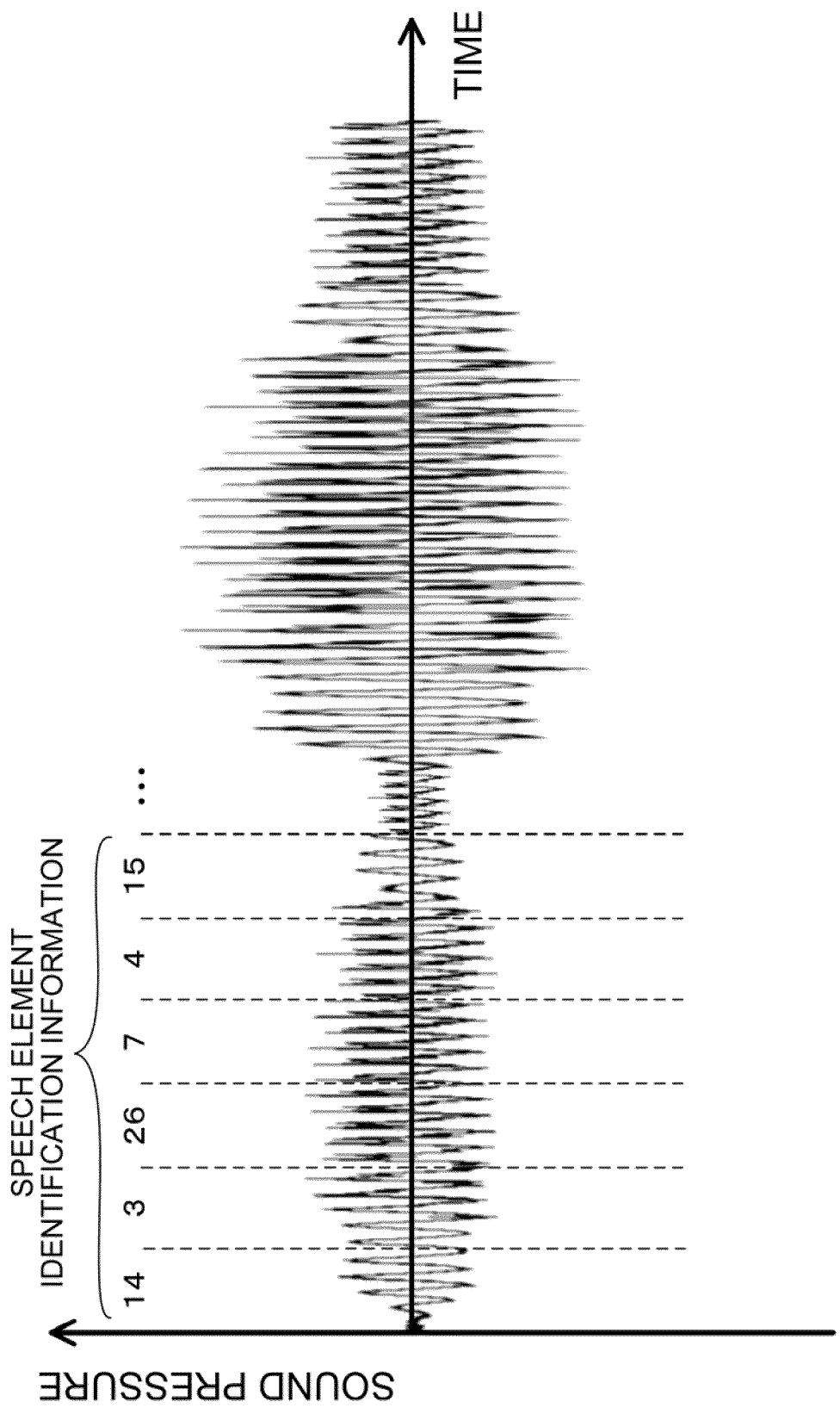
FIG. 4 is an explanation view conceptually showing the waveform of speech uttered by a speech registering user.

At this time, the speech element information storage 22 stores speech element information and speech element identification information in association with each other so that, in a case that integers represented by the speech element identification information corresponding to speech elements are arranged in the order of arrangement of the speech elements in the speech uttered by the speech registering user, the integers are arranged at random as shown in FIG. 4.

In other words, the speech element information storage 22 stores speech element information and speech element identification information in association with each other so that, in a case that the speech element identification, information corresponding to speech elements are arranged in the order of arrangement of the speech elements in the speech uttered by the speech registering user, at least one of the speech element identification information identifying the respective speech element information has different information from information arranged in accordance with a predetermined rule (in this embodiment, a rule in which integers increase by one).

The speech element information transmitter 23 transmits, to the client device 10, speech element information stored in association with the speech element identification information received by the speech-element-identification-information receiver 21, from among the speech element information stored in the storing device by the speech element information storage 22.

Next, the operation of the speech synthesis system 1 will be described specifically.

First, the operation of the speech synthesis system 1 when the server device 20 accumulates (stores) speech element information based on newly inputted speech information.

Figure 5:
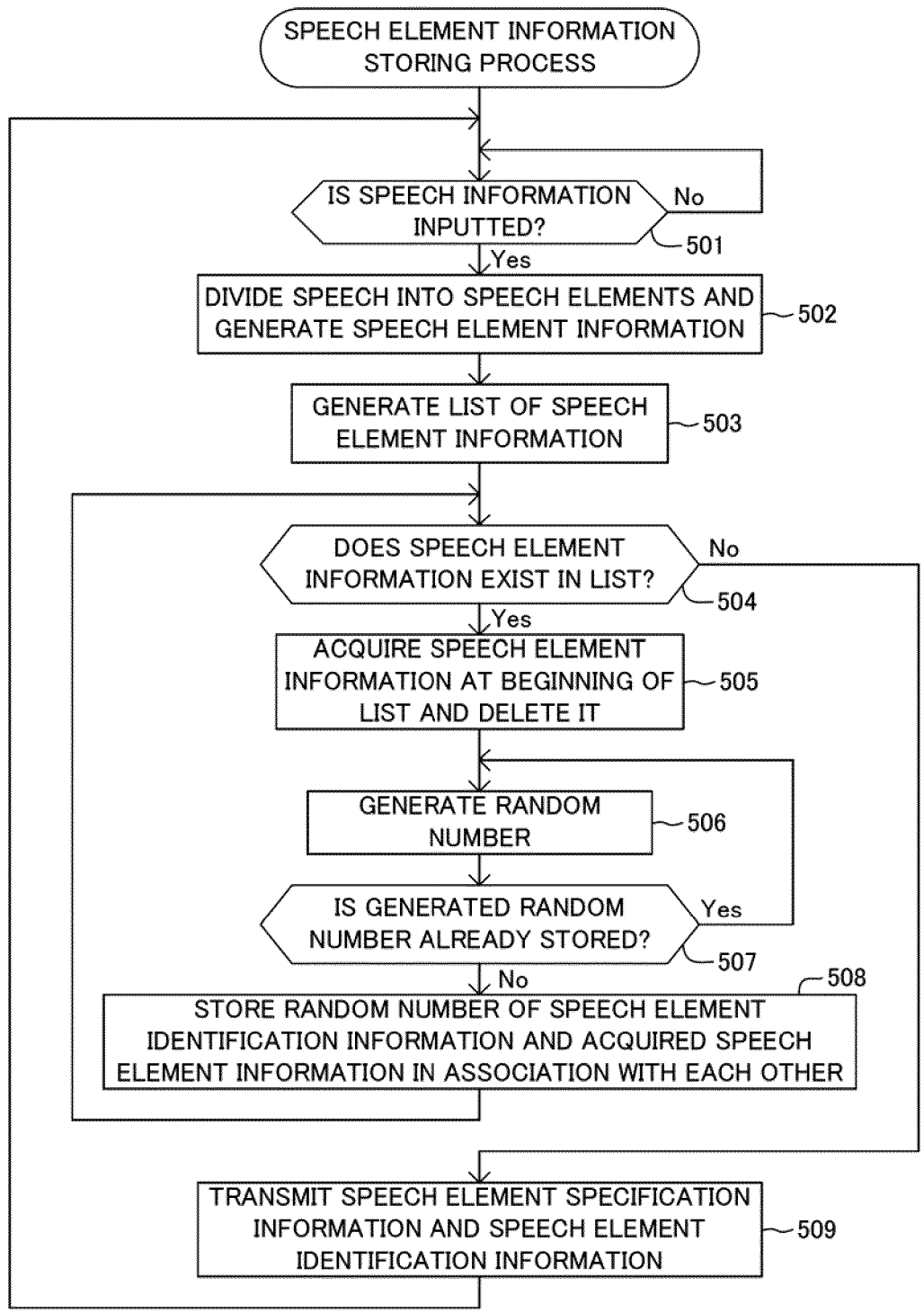
FIG. 5 is a flowchart showing a speech element-information storing process program executed by a CPU of the server device shown in FIG. 1.

The CPU of the server device 20 is configured to execute a speech element-information storing process program shown by a flowchart in FIG. 5 only once at the time of startup of the server device 20. Execution of the process of the speech element-information storing process program corresponds to a speech element-information storing process flow.

To be specific, after starting the process of the speech element-information storing process program, the CPU stands by until speech information is inputted at step 501.

Then, when speech information is inputted, the CPU determines "Yes" and, at step 502, generates speech element information by dividing speech represented by the inputted speech information (speech uttered by a speech registering user) into speech elements.

Next, the CPU generates a list of the generated speech element information at step 503. This list is a list in which the speech element information representing the speech elements are arranged in the order of arrangement of the speech elements in the speech uttered by the speech registering user.

Then, at step 504, the CPU determines whether the speech element information exists in the generated list.

In this state, since the speech element information exists in the list, the CPU determines "Yes" and, at step 505, acquires speech element information at the beginning of the list and deletes the acquired speech element information from the list.

Then, the CPU generates only one random integer (pseudorandom number in this embodiment) at step 506. Next, at step 507, the CPU determines whether the generated random number is already stored in the storing device of the server device 20 as speech element identification information.

In a case that the generated random number is already stored in the storing device as speech element identification information, the CPU determines "Yes" and returns to step 506 to generate a random number again. That is to say, the CPU repeats generation of a random number until a random number that is not stored yet in the storing device is generated as speech element identification information.

In a case that the generated random number is not stored yet in the storing device as speech element identification information, the CPU determines "No" at step 507 and proceeds to step 508. Then, the CPU causes the storing device of the server device 20 to store the speech element information acquired at step 505 and the random number acquired at step 506 as speech element identification information in association with each other.

Next, the CPU returns to step 504, and repeats execution of the process from step 504 to step 508 until all of the speech element information are deleted from the list.

Then, when all of the speech element information are deleted from the list, the CPU determines "No" at step 504 and proceeds to step 509 to generate speech element specification information (phoneme information, prosody information, and so on) that specifies the speech elements represented by the speech element information newly stored into the storing device at step 508.

Furthermore, the CPU transmits, to the client device 10, the speech element identification information newly stored into the storing device at step 508 and the speech element specification information that specifies the speech element represented by the speech element information stored in association with the speech element identification information, so as to be association with each other.

On the other hand, upon reception of the speech element identification information and the speech element specification information from the server device 20, the client device 10 stores the received speech element identification information and speech element specification information in association with each other into the storing device of the client device (refer to FIG. 2).

After that, the CPU returns to step 501 and repeats execution of the process from step 501 to step 509.

Thus, by execution of the speech element-information storing process program by the CPU of the server device 20, in a case that the speech information representing the speech shown in FIG. 4 is inputted, the server device 20 stores the speech element information and the speech element identification information into the storing device in association with each other as shown in FIG. 3.

Figure 6:
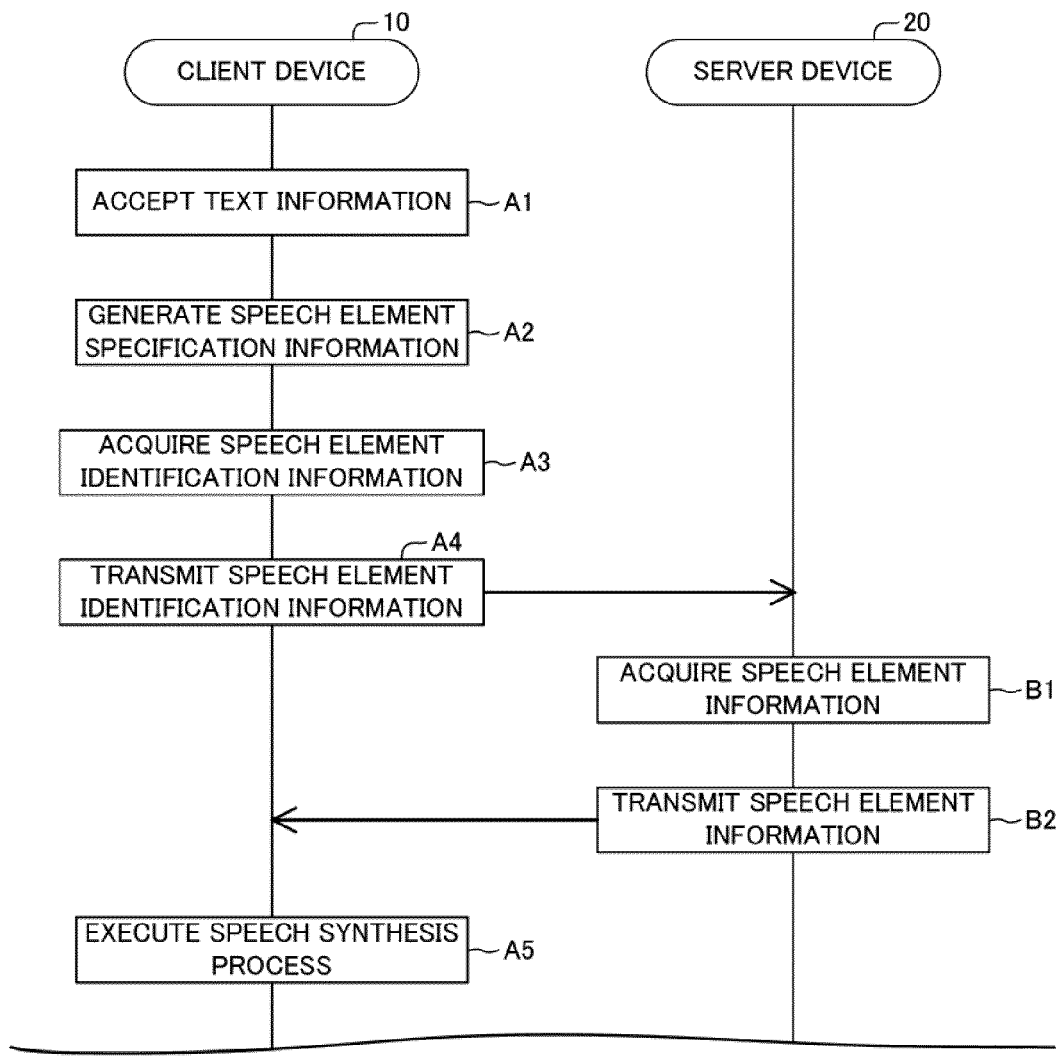
FIG. 6 is a sequence view showing the operation of the speech synthesis system when the client device executes a speech synthesis process by acquiring speech element information from the server device.

Next, the operation of the speech synthesis system 1 when the client device 10 executes a speech synthesis process by acquiring speech element information from the server device 20 will be described with reference to FIG. 6.

First, a user (a speech synthesizing user) of the client device 10 inputs text information into the client device 10 by using the keyboard.

The client device 10 accepts the inputted text information (step A1).

Next, the client device 10 generates speech element specification information (phoneme information, prosody information, and so on) based on the accepted text information (step A2).

Then, the client device 10 acquires speech element identification information stored in the storing device of the client device 10 in association with the generated speech element specification information (step A3).

Next, the client device 10 transmits the acquired speech element identification information to the server device 20 (step A4).

On the other hand, the server device 20 receives the speech element identification information transmitted by the client device 10 (a speech element identification information receiving flow). Then, the server device 20 acquires speech element information stored in the storing device of the server device 20 in association with the received speech element identification information (step B1). Next, the server device 20 transmits the acquired speech element information to the client device 10 (step B2, a speech element-information transmitting flow).

Consequently, the client device 10 receives the speech element information from the server device 20. Then, based on the received speech element information, the client device 10 generates speech information obtained by converting text represented by the accepted text information into speech (executes the speech synthesis process) (step A5).

After that, the client device 10 outputs the speech represented by the generated speech information from the speaker.

As described above, according to the first embodiment of the speech synthesis system of the present invention, even if the client device 10 used by a fraudulent user transmits speech element identification information arranged in accordance with a rule (for example, a plurality of integers increased by one (namely, consecutive integers)) to the server device 20, it is possible to prevent the server device 20 from transmitting a portion including consecutive speech elements in speech uttered by a speech registering user to the client device 10. Therefore, it is possible to reduce a possibility that the portion including consecutive speech elements in the speech uttered by the speech registering user is acquired by the fraudulent user.

MODIFIED EXAMPLE 1

Next, a speech synthesis system according to a modified example 1 of the first embodiment will be described. This speech synthesis system according to the modified example 1 is different from the speech synthesis system according to the first embodiment in that the speech synthesis system according to the modified example 1 is configured so that integers represented by speech element identification information stored in association with speech element information representing, two similar speech elements, respectively, become consecutive integers. Therefore, a description will be made below, focusing on such a difference.

Figure 7:
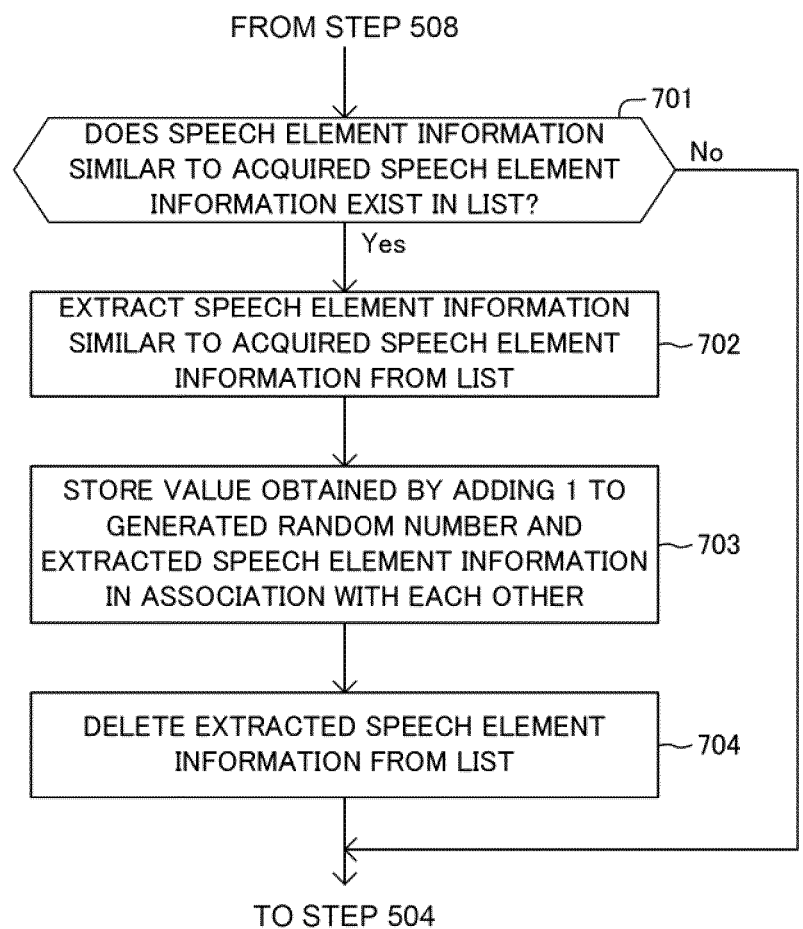
FIG. 7 is a flowchart showing a process executed by a CPU of a server device according to a modified example 1 of the first embodiment, which is a process executed in addition to the speech element-information storing process program shown in FIG. 5.

The server device 20 in this modified example executes, instead of the speech element-information storing process program shown in FIG. 5, a program in which processes from steps 701 to 704 shown in FIG. 7 are added immediately after the process of step 508 in the program shown in FIG. 5.

Therefore, after executing the process of step 508, the CPU of the server device 20 proceeds to step 701 to determine whether speech element information representing a speech element similar to the speech element represented by the speech element information acquired at step 505 exists in the list generated at step 503.

To be specific, the CPU calculates, in accordance with a predetermined algorithm, an agreement rate between the speech element represented by the acquired speech element information and the speech element represented by the speech element information included in the list (an index value representing the degree of agreement between these speech elements). Then, the CPU determines whether the list includes such speech element information that the calculated agreement rate is higher than a predetermined threshold.

In a case that the list does not include speech element information representing a speech element similar to the speech element represented by the acquired speech element information, the CPU determines "No" at step 701 and proceeds to step 504.

On the other hand, in a case that the list includes speech element information representing a speech element similar to the speech element represented by the acquired speech element information, the CPU determines "Yes" at step 701 and proceeds to step 702.

Then, the CPU extracts the speech element information representing the speech element similar to the speech element represented by the acquired speech element information from the list. Next, at step 703, the CPU causes the storing device of the server device 20 to store the extracted speech element information and a value obtained by adding 1 to the random number generated at step 506, which is the speech element identification information, in association with each other.

Next, the CPU deletes the extracted speech element information from the list at step 704. Then, the CPU proceeds to step 504.

Thus, the server device 20 causes the storing device to store speech element information and speech element identification information in association with each other so that an integer represented by speech element identification information corresponding to one of two similar speech elements becomes a value obtained by adding 1 to an integer represented by speech element identification information corresponding to the other of the two speech elements.

As described above, according to the modified example 1 of the first embodiment of the speech synthesis system of the present invention, in a case that the client device 10 used by a fraudulent user transmits consecutive integers to the server device 20, the server device 20 transmits speech element information that represent two similar speech elements, respectively.

Consequently, it is possible to further reduce a possibility that the speech is inferred by the fraudulent user based on the speech element information received from the server device 20. As a result, it is possible to further reduce a possibility that the speech is reproduced (restored) with the client device 10 used by the fraudulent user.

MODIFIED EXAMPLE 2

Next, a speech synthesis system according to a modified example 2 of the first embodiment will be described. This speech synthesis system according to the modified example 2 is different from the speech synthesis system according to the first embodiment in that the server device 20 is configured to, when receiving speech element identification information that is not stored in the storing device, output error information and block communication with the device having transmitted the speech element identification information. Therefore, a description will be made below, focusing on such a difference.

Figure 8:
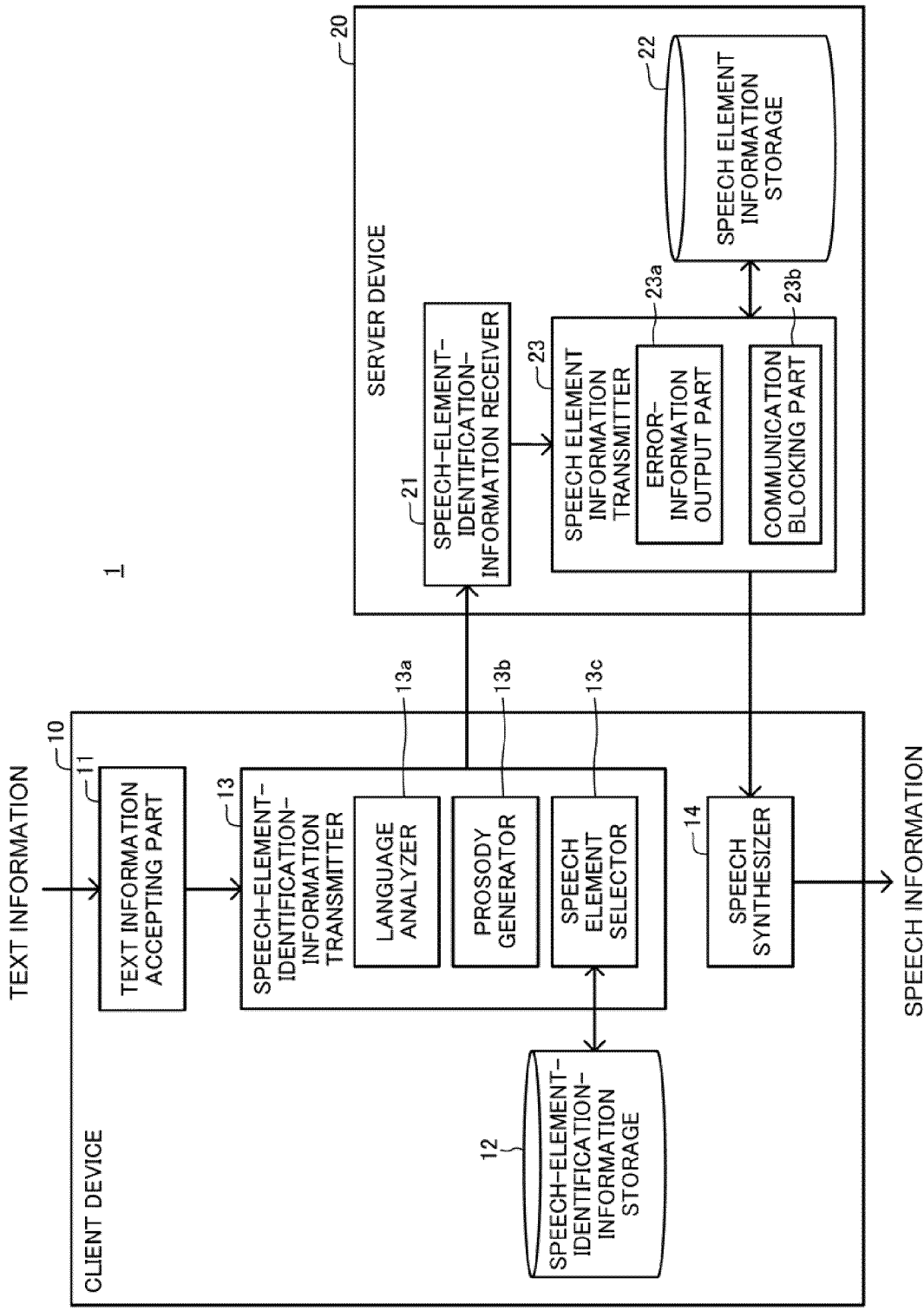
FIG. 8 is a block diagram schematically showing the function of a speech synthesis system according to a modified example 2 of the first embodiment.

The speech element information transmitter 23 of the server device 20 of this modified example 2, as shown in FIG. 8, includes an error-information output part (an error-information output unit) 23a and a communication blocking part (a communication blocking unit) 23b.

In a case that speech element identification information received from the client device 10 is not stored in the storing device, the error-information output part 23a outputs error information representing the fact (display on a display, and/or write into a log file). Consequently, it is possible to make an administrator of the server device 20 immediately recognize existence of the client device 10 aiming to fraudulently acquire speech element information. As a result, the administrator can quickly take measures against this status.

In a case that the speech element identification information received from the client device 10 is not stored in the storing device, the communication blocking part 23b blocks communication with the client device 10. Consequently, it is possible to prevent the server device 20 from transmitting speech element information to the client device 10 aiming to fraudulently acquire the speech element information.

The speech element information transmitter 23 includes both the error-information output part 23a and the communication blocking part 23b in this modified example 2, but may include only one of them.

Second Exemplary Embodiment

Next, a second embodiment of the speech synthesis system according to the present invention will be described. The speech synthesis system according to the second embodiment is different from the speech synthesis system according to the first embodiment in that: the server device 20 is configured to store speech element information of low sound quality and speech element information of high sound quality; and the server device 20 is configured to execute a speech synthesis process based on the speech element information of high sound quality in response to a request from a user (a speech synthesizing user) and transmit the generated speech information to the client device 10. Therefore, a description will be made below focusing on such a difference.

Figure 9:
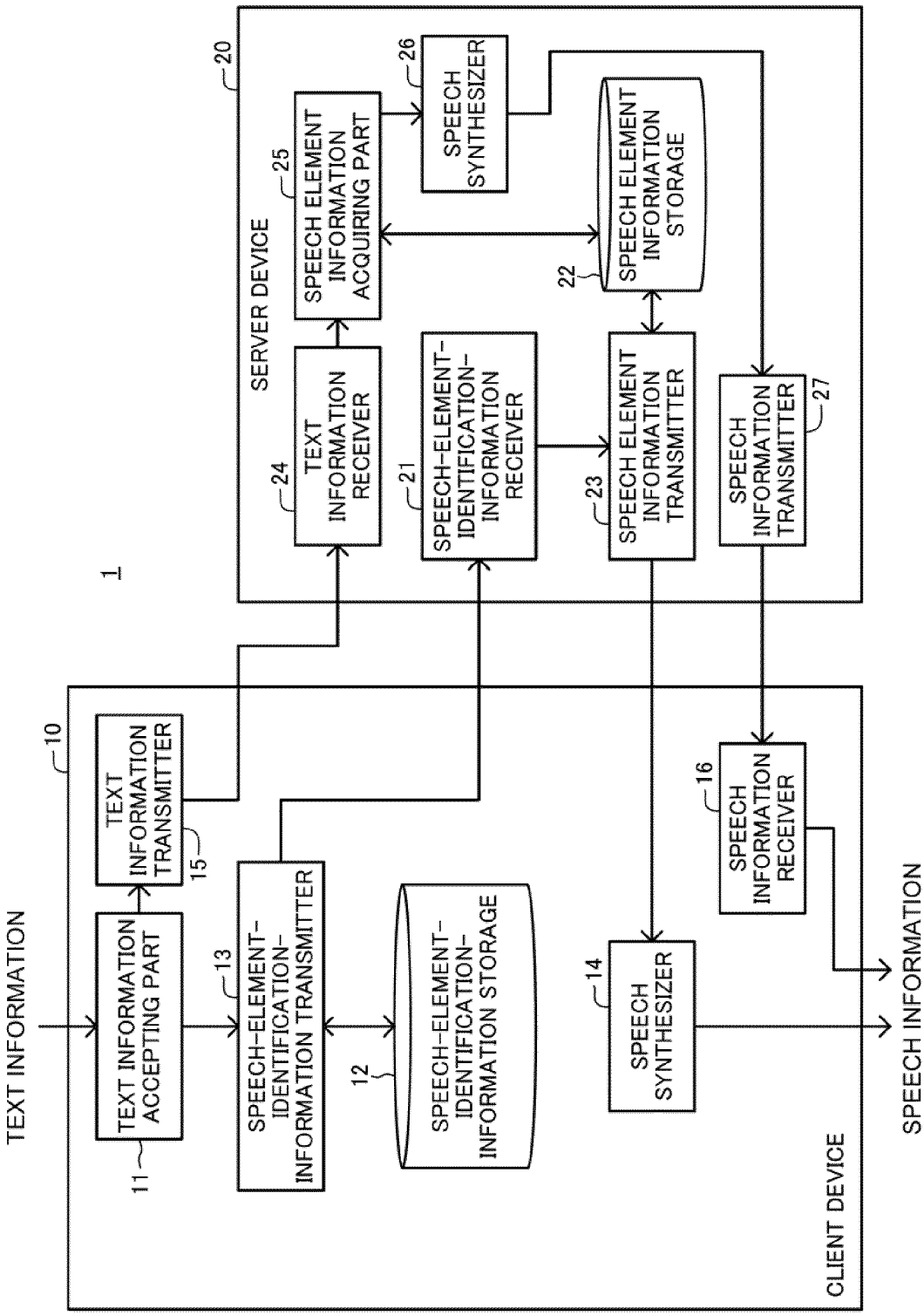
FIG. 9 is a block diagram schematically showing the function of a speech synthesis system of the second embodiment.

As shown in FIG. 9, the function of the client device 10 includes a text information transmitter (a text information transmitting unit) 15 and a speech information receiver (a speech information receiving unit) 16, in addition to a function similar to that of the client device 10 of the first embodiment including from the text information accepting part 11 to the speech synthesizer 14.

The text information transmitter 15 transmits text information accepted by the text information accepting part 11 to the server device 20.

The speech information receiver 16 receives speech information transmitted by the server device 20.

Further, the function of the server device 20 includes a text information receiver (a text information receiving unit) 24, a speech element information acquiring part (part of the speech synthesizing unit) 25, a speech synthesizer (part of the speech synthesizing unit) 26 and a speech information transmitter (a speech information transmitting unit) 27, in addition to a function similar to that of the server device 20 of the first embodiment including from the speech-element-identification-information receiver 21 to the speech element information transmitter 23.

Besides, the server device 20 stores, in the storing device of the server device 20, speech element specification information and speech element identification information in association with each other, in a like manner as the speech-element-identification-information storage 12.

Further, as shown in FIG. 10, the speech element information storage 22 stores, in the storing device of the server device 20, speech element identification information representing an integer, low-sound-quality speech element information of low sound quality (first speech element information) and high-sound-quality speech element information (second speech element information) of higher sound quality than the low-sound-quality speech element information in association with one another. The low-sound-quality speech element information and the high-sound-quality speech element information stored in association with each other are information representing the same speech element.

In this embodiment, the low-sound-quality speech element information is information representing a speech element extracted from speech with a sampling frequency of 8 kHz, and the high-sound-quality speech element information is information representing a speech element extracted from speech with a sampling frequency of 44 kHz. That is to say, the high-sound-quality speech element information is information of higher sound quality than the low-sound-quality speech element information. Moreover, in general, the amount of data (the size of data) of the low-sound-quality speech element information is smaller than that of the high-sound-quality speech element information.

The low-sound-quality speech element information may be information with high compression ratio, and the high-sound-quality speech element information may be information with lower compression ratio than the low-sound-quality speech element information.

Further, as in the first embodiment, the speech element information storage 22 causes the storing device of the server device 20 to store speech element information (the first speech element information and the second speech element information) and speech element identification information in association with each other so that, in a case that integers represented by speech element identification information corresponding to respective speech elements in speech uttered by a speech registering user are arranged in the order of arrangement of the speech elements, the integers are arranged at random.

Further, the text information receiver 24 receives text information transmitted by the client device 10.

The speech element information acquiring part 25 has a function similar to the function of the client device 10 of the first embodiment including the language analyzer 13a, the prosody generator 13b and the speech element selector 13c.

That is to say, the speech element information acquiring part 25 generates speech element specification information including phoneme information and prosody information based on text represented by the text information received by the text information receiver 24. Then, the speech element information acquiring part 25 acquires speech element identification information stored in the storing device of the server device 20 in association with the generated speech element specification information.

The speech synthesizer 26 has a like function as the speech synthesizer 14. That is to say, the speech synthesizer 26 executes a speech synthesis process based on the speech element information acquired by the speech element information acquiring part 25.

The speech information transmitter 27 transmits the speech information generated by the speech synthesizer 26 to the client device 10.

Next, the operation of the speech synthesis system 1 according to the second embodiment will be described.

This speech synthesis system 1 operates in a like manner as in the first embodiment in a case that a user of the client device 10 (a speech synthesizing user) requires execution of a low-sound-quality speech synthesis process (for example, in a case that the speech synthesizing user inputs information representing a request for execution of the low-sound-quality speech synthesis process).

That is to say, the client device 10 acquires speech element identification information based on the text information inputted by the speech synthesizing user, and transmits the acquired speech element identification information to the server device 20. On the other hand, the server device 20 receives the speech element identification information from the client device 10, and transmits low-sound-quality speech element information stored in association with the received speech element identification information to the client device 10.

Then, the client device 10 receives the low-sound-quality speech element information from the server device 20, and executes a speech synthesis process based on the received low-sound-quality speech element information. Then, the client device 10 outputs speech represented by the generated speech information from the speaker.

Figure 11:
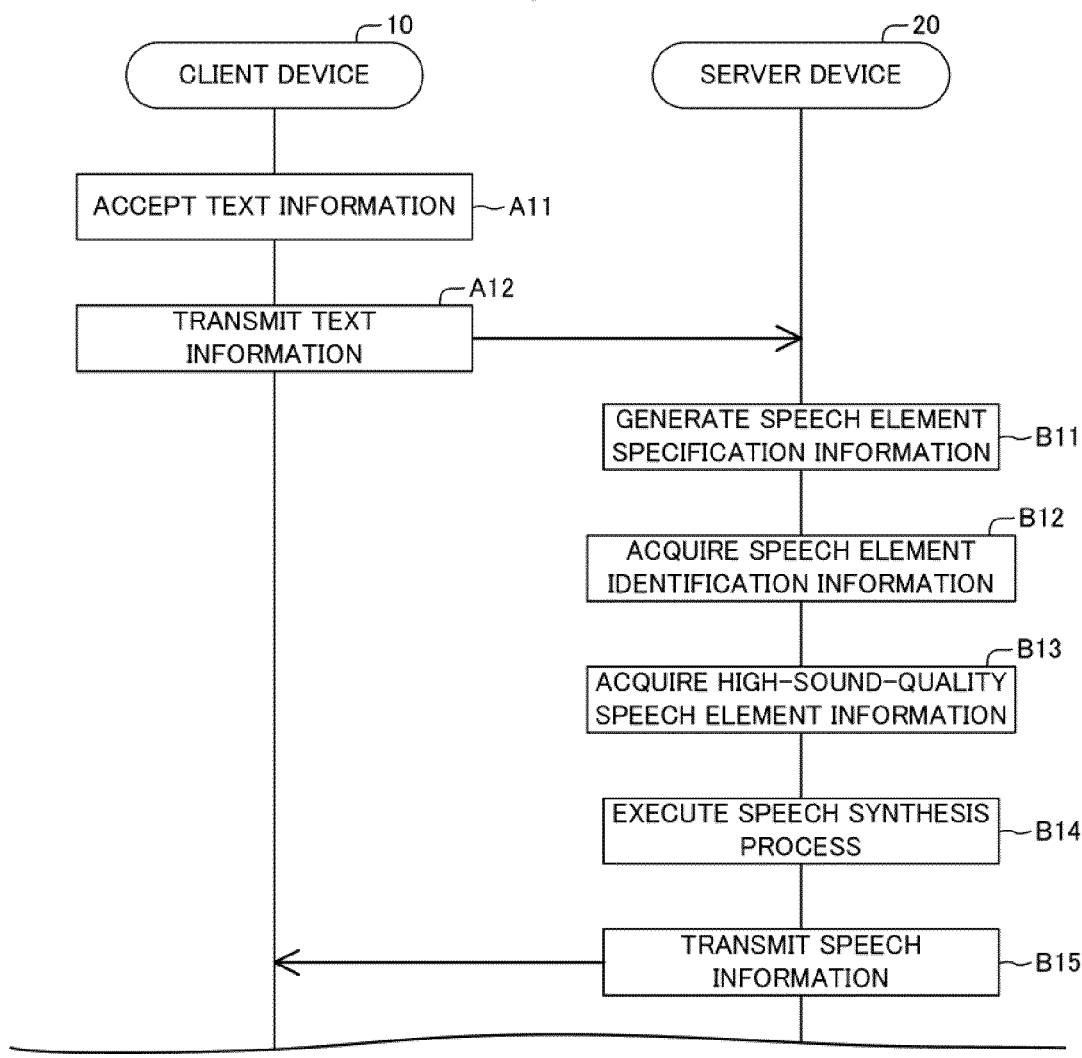
FIG. 11 is a sequence view showing the operation of a speech synthesis system when the server device executes a speech synthesis process according to the second embodiment.

Further, in a case that the speech synthesizing user of the client device 10 requires execution of a high-sound-quality speech synthesis process, the client device 10 transmits the accepted text information to the server device 20 as shown in FIG. 11 (step A12).

On the other hand, the server device 20 receives the text information transmitted by the client device 10. Then, the server device 20 generates speech element specification information (phoneme information, prosody information, and so on) based on the received text information (step B11).

Then, the server device 20 acquires speech element identification information stored in the storing device of the server device 20 in association with the generated speech element specification information (step B12). Next, the server device 20 acquires high-sound-quality speech element information stored in the storing device in association with the acquired speech element identification information (step B13).

Then, the server device 20 executes a speech synthesis process based on the acquired high-sound-quality speech element information (step B14). Next, the server device 20 transmits the generated speech information to the client device 10 (step B15).

Then, the client device 10 receives the speech information transmitted by the server device 20, and outputs speech represented by the received speech information from the speaker.

As described above, according to the second embodiment of the speech synthesis system of the present invention, the speech synthesis system 1 is capable of executing a speech synthesis process based on low-sound-quality speech element information (the first speech element information) in a case that rapid transmission of speech element information and/or reduction of communication load is required, whereas executing a speech synthesis process based on high-sound-quality speech element information (the second speech element information) in a case that the quality of generated speech information needs to be high. Consequently, it is possible to increase convenience for a speech synthesizing user who uses the client device 10.

Furthermore, according to the second embodiment, even if information is monitored on a communication path between the server device 20 and the client device 10, it is possible to prevent that high-sound-quality speech element information is acquired by a fraudulent user. That is to say, it is possible to prevent that high-sound-quality speech element information is fraudulently utilized.

Additionally, also in the second embodiment, it is possible to produce like actions and effects as in the first embodiment.

Third Exemplary Embodiment

Figure 12:
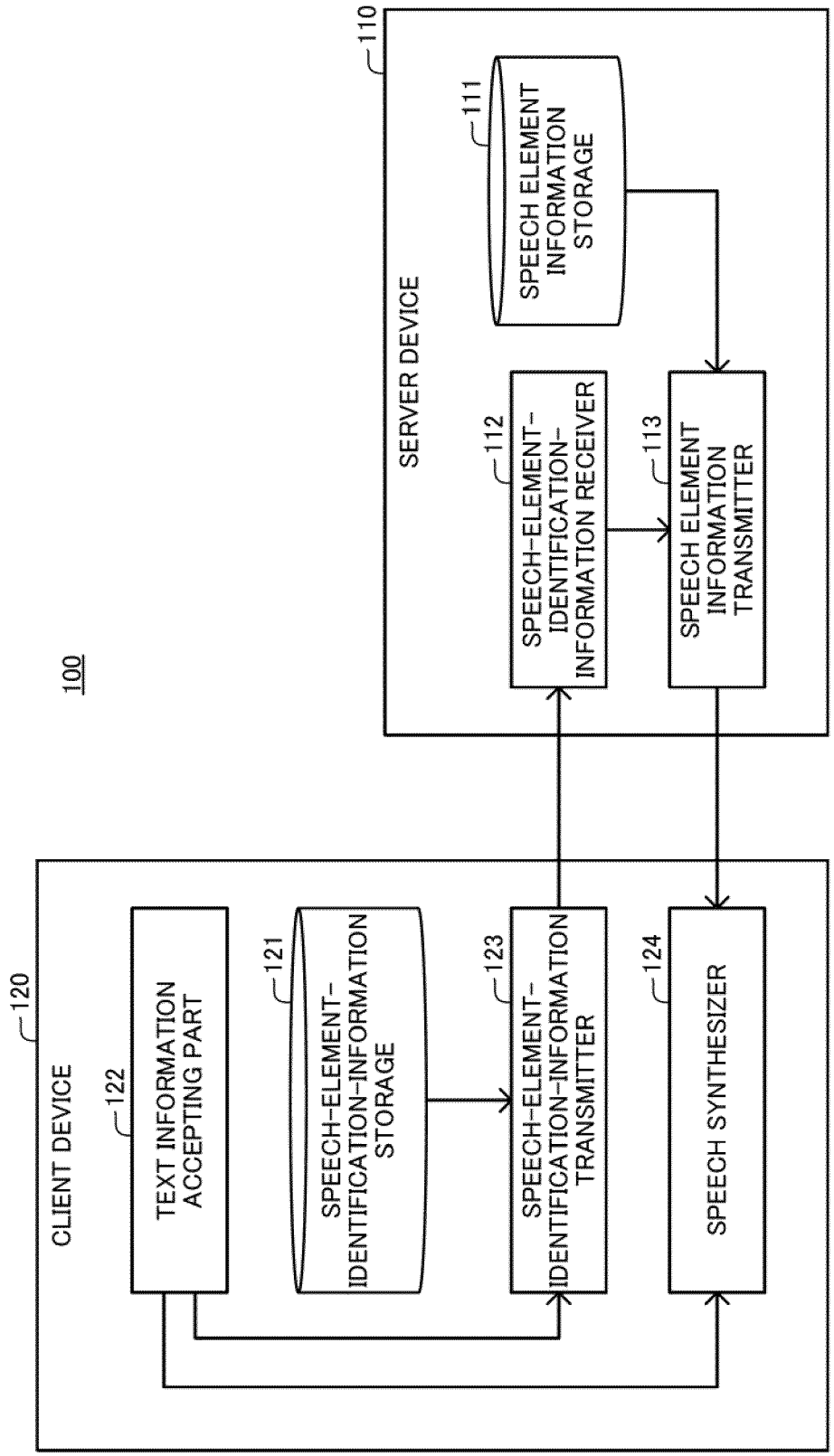
FIG. 12 is a block diagram schematically showing the function of a speech synthesis system according to a third embodiment of the present invention.

Next, a speech synthesis system according to a third embodiment of the present invention will be described with reference to FIG. 12.

A speech synthesis system 100 according to the third embodiment is a system including a server device 110 and a client device 120 connected so as to be capable of communicating with each other.

The function of the server device 110 includes a speech element information storage (a speech element information storing unit) 111, a speech-element-identification-information receiver (a speech-element-identification-information receiving unit) 112, and a speech element information transmitter (a speech element information transmitting unit) 113.

The speech element information storage 111 stores speech element information and speech element identification information in association with each other so that, in a case that speech element information representing respective speech elements included in speech uttered by a speech registering user are arranged in the order of arrangement of the speech elements in the speech, at least one of speech element identification information identifying the respective speech element information has different information from information arranged in accordance with a predetermined rule.

The speech-element-identification-information receiver 112 receives the speech element identification information from the client device 120.

The speech element information transmitter 113 transmits, to the client device 120, speech element information stored in the speech element information storage 111 in association with the received speech element identification information.

Further, the function of the client device 120 includes a speech-element-identification-information storage (a speech-element-identification-information storing unit) 121, a text information accepting part (a text information accepting unit) 122, a speech-element-identification-information transmitter (a speech-element-identification-information transmitting unit) 123, and a speech synthesizer (a speech synthesizing unit) 124.

The speech-element-identification-information storage 121 stores speech element specification information specifying a speech element and the abovementioned speech element identification information in association with each other.

The text information accepting part 122 accepts text information representing text.

The speech-element-identification-information transmitter 123 generates speech element specification information based on the text information accepted by the text information accepting part 122 and transmits, to the server device 110, speech element identification information stored in the speech-element-identification-information storage 121 in association with the generated speech element specification information.

The speech synthesizer 124 receives speech element information from the server device 110, and generates speech information obtained by converting text represented by the text information accepted by the text information accepting part 122 into speech, based on the received speech element information.

According to the third embodiment, even if a client device used by a fraudulent user transmits, to the server device 110, speech element identification information arranged in accordance with a rule (for example, a plurality of integers increased by 1 (i.e., consecutive integers), it is possible to prevent the server device 110 from transmitting a portion including consecutive speech elements in speech uttered by a user (a speech registering user) to the client device. Therefore, it is possible to reduce a possibility that the portion including the consecutive speech elements in the speech uttered by the speech registering user is acquired by the fraudulent user.

In this case, it is favorable that: the speech element identification information is information representing an integer; and the speech element information storing unit is configured to store the speech element information and the speech element identification information in association with each other so that, in a case that integers represented by the speech element identification information corresponding to speech elements are arranged in the order of arrangement of the speech elements in the speech, the integers include a pair of two adjacent integers in which an integer at the end has a different value from a value obtained by adding 1 to an integer at the beginning.

According to the above, even if a client device used by a fraudulent user transmits consecutive integers to a server device, it is possible to prevent the server device from transmitting a portion including consecutive speech elements in speech uttered by a user (a speech registering user) to the client device. Therefore, it is possible to reduce a possibility that the portion including the consecutive speech elements in the speech uttered by the speech registering user is acquired by the fraudulent user.

In this case, it is favorable that the speech element information storing unit is configured to store the speech element information and the speech element identification information in association with each other so that, in a case that the integers represented by the speech element identification information corresponding to the speech elements are arranged in the order of arrangement of the speech elements in the speech, the integers are arranged at random.

According to the above, in a case that a client device used by a fraudulent user transmits consecutive integers to a server device, it is possible to further reduce a possibility that the server device transmits a portion including consecutive speech elements in speech uttered by a speech registering user to the client device. As a result, it is possible to further reduce a possibility that the portion including the consecutive speech elements in the speech uttered by the speech registering user is acquired by the fraudulent user.

In this case, it is favorable that the speech element information storing unit is configured to store the speech element information and the speech element identification information in association with each other so that an integer represented by speech element identification information corresponding to one of two similar speech elements becomes a value obtained by adding 1 to an integer represented by speech element identification information corresponding to the other of the two speech elements.

According to the above, in a case that a client device used by a fraudulent user transmits consecutive integers to a server device, the server device transmits speech element information representing each of two similar speech elements. Consequently, it is possible to further reduce a possibility that the speech is inferred by the fraudulent user based on the speech element information received from the server device. As a result, it is possible to further reduce a possibility that the speech is reproduced (restored) with the client device used by the fraudulent user.

In this case it is favorable that the server device includes an error-information output unit configured to, in a case that the speech element identification information received from the client device is not stored by the speech element information storing unit, output error information representing the fact.

According to the above, it is possible to make an administrator of a server device immediately recognize existence of a client device aiming to fraudulently acquire speech element information. As a result, the administrator can quickly take measures against this status.

In this case, it is favorable that the server device includes a communication blocking unit configured to block communication with the client device in a case that the speech element identification information received from the client device is not stored by the speech element information storing unit.

According to the above, it is possible to prevent the server device from transmitting speech element information to a client device aiming to fraudulently acquire the speech element information.

In this case, it is favorable that the speech element information storing unit is configured to store first speech element information of low sound quality and second speech element information of higher sound quality than the first speech element information, as the speech element information representing one speech element.

The data amount (the data size) of low-sound-quality speech element information is smaller than that of high-sound-quality speech element information. Therefore, according to the above configuration, the speech synthesis system is capable of executing a speech synthesis process based on the first speech element information of low sound quality in a case that rapid transmission of speech element information and/or reduction of communication load is required, whereas executing a speech synthesis process based on the second speech element information of high sound quality in a case that the quality of generated speech information needs to be high. Consequently, it is possible to increase convenience for a user who uses a client device (a speech synthesizing user).

In this case, it is favorable that: the client device includes a text information transmitting unit configured to transmit the accepted text information to the server device, and a speech information receiving unit configured to receive speech information transmitted from the server device; and the server device includes a text information receiving unit configured to receive the text information transmitted from the client device, a speech synthesizing unit configured to generate speech information obtained by converting text represented by the received text information into speech based on the received text information and the stored second speech element information, and a speech information transmitting unit configured to transmit the generated speech information to the client device.

According to the above, even if information is monitored on a communication path between a server device and a client device, it is possible to prevent that high-sound-quality speech element information is acquired by a fraudulent user. That is to say, it is possible to prevent that high-sound-quality speech element information is fraudulently utilized.

Further, a speech element providing device of another embodiment of the present invention includes: a speech element information storing unit configured to store speech element information and speech element identification information in association with each other so that, in a case that speech element information representing respective speech elements included in speech uttered by a speech registering user are arranged in the order of arrangement of the speech elements in the speech, at least one of speech element identification information identifying the respective speech element information has different information from information arranged in accordance with a predetermined rule; a speech-element-identification-information receiving unit configured to receive the speech element identification information; and a speech element information transmitting unit configured to transmit the speech element information stored in the storing device in association with the received speech element identification information.

In this case, it is favorable that: the speech element identification information is information representing an integer; and the speech element information storing unit is configured to store the speech element information and the speech element identification information in association with each other so that, in a case that integers represented by the speech element identification information corresponding to the speech elements are arranged in the order of arrangement of the speech elements in the speech, the integers include a pair of two adjacent integers in which an integer at the end has a different value from a value obtained by adding 1 to an integer at the beginning.

In this case, it is favorable that the speech element information storing unit is configured to store the speech element information and the speech element identification information in association with each other so that, in a case that the integers represented by the speech element identification information corresponding to the speech elements are arranged in the order of arrangement of the speech elements in the speech, the integers are arranged at random.

Further, a speech element providing method of another embodiment of the present invention is a method of causing a storing device to store speech element information and speech element identification information in association with each other so that, in a case that speech element information representing respective speech elements included in speech uttered by a speech registering user are arranged in the order of arrangement of the speech elements in the speech, at least one of speech element identification information identifying the respective speech element information has different information from information arranged in accordance with a predetermined rule; receiving the speech element identification information; and transmitting the speech element information stored in the storing device in association with the received speech element identification information.

In this case, it is favorable that the speech element identification information is information representing an integer and the speech element providing method includes: at the time of causing the storing device to store the speech element information and the speech element identification information in association with each other, causing the storing device to store the speech element information and the speech element identification information in association with each other so that, in a case that integers represented by the speech element identification information corresponding to the speech elements are arranged in the order of arrangement of the speech elements in the speech, the integers include a pair of two adjacent integers in which an integer at the end has a different value from a value obtained by adding 1 to an integer at the beginning.

In this case, it is favorable that the speech element providing method includes: at the time of causing the storing device to store the speech element information and the speech element identification information in association with each other, causing the storing device to store the speech element information and the speech element identification information in association with each other so that, in a case that the integers represented by the speech element identification information corresponding to the speech elements are arranged in the order of arrangement of the speech elements in the speech, the integers are arranged at random.

Further, a speech element providing program product of another embodiment of the present invention is a program product comprising computer implementable instructions for causing a speech element providing device including a storing device, to realize: a speech element-information storing process unit configured to cause the storing device to store speech element information and speech element identification information in association with each other so that, in a case that speech element information representing respective speech elements included in speech uttered by a speech registering user are arranged in the order of arrangement of the speech elements in the speech, at least one of speech element identification information identifying the respective speech element information has different information from information arranged in accordance with a predetermined rule: a speech-element-identification-information receiving unit configured to receive the speech element identification information; and a speech element information transmitting unit configured to transmit the speech element information stored in the storing device in association with the received speech element identification information.

In this case, it is favorable that: the speech element identification information is information representing an integer; and the speech element-information storing process unit is configured to cause the storing device to store the speech element information and the speech element identification information in association with each other so that, in a case that integers represented by the speech element identification information corresponding to the speech elements are arranged in the order of arrangement of the speech elements in the speech, the integers include a pair of two adjacent integers in which an integer at the end has a different value from a value obtained by adding 1 to an integer at the beginning.

In this case, it is favorable that the speech element-information storing process unit is configured to cause the storing device to store the speech element information and the speech element identification information in association with each other so that, in a case that the integers represented by the speech element identification information corresponding to the speech elements are arranged in the order of arrangement of the speech elements in the speech, the integers are arranged at random.

Further, a speech synthesis method of another embodiment of the present invention is applied to a speech synthesis system including a server device and a client device connected so as to be capable of communicating with each other, and includes: accepting text information representing text, by the client device; generating speech element specification information specifying a speech element, based on the accepted text information, by the client device; transmitting, to the server device by the client device, speech element identification information stored in association with the generated speech element specification information in a storing device configured to store speech element identification information identifying speech element information representing a speech element and speech element specification information specifying a speech element in association with each other, the storing device being included by the client device; receiving the speech element identification information from the client device, by the server device; transmitting, to the client device by the server device, speech element information stored in association with the received speech element identification information in a storing device configured to store speech element information and speech element identification information in association with each other so that, in a case that speech element information representing respective speech elements included in speech uttered by a speech registering user, at least one of the speech element identification information identifying the respective speech element information has different information from information arranged in accordance with a predetermined rule, the storing device being included by the server device; and receiving the speech element information from the server device and, based on the received speech element information, generate speech information obtained by converting text represented by the accepted text information into speech, by the client device.

In this case, it is favorable that the speech element identification information is information representing an integer and the speech synthesis method includes: when causing the storing device to store the speech element information and the speech element identification information in association with each other, causing the storing device by the server device, to store the speech element information and the speech element identification information in association with each other so that, in a case that integers represented by the speech element identification information corresponding to the speech elements are arranged in the order of arrangement of the speech elements in the speech, the integers include a pair of two adjacent integers in which an integer at the end has a different value from a value obtained by adding 1 to an integer at the beginning.

In this case, it is favorable that the speech synthesis method includes: when causing the storing device to store the speech element information and the speech element identification information in association with each other, causing the storing device by the server device to store the speech element information and the speech element identification information in association with each other so that, in a case that the integers represented by the speech element identification information corresponding to the speech elements are arranged in the order of arrangement of the speech elements in the speech, the integers are arranged at random.

Further, a client device of another embodiment of the present invention is a device connected to a server device so as to be capable of communicating therewith. Furthermore, this client device includes: a speech-element-identification-information storing unit configured to store speech element identification information and speech element specification information in association with each other, the speech element identification information being set so that, in a case that speech element information representing respective speech elements included in speech uttered by a speech registering user are arranged in the order of arrangement of the speech elements in the speech, at least one of speech element identification information identifying the respective speech element information has different information from information arranged in accordance with a predetermined rule, and the speech element specification information specifying a speech element; a text information accepting unit configured to accept text information representing text; a speech-element-identification-information transmitting unit configured to generate speech element specification information based on the accepted text information and transmit, to the server device, the speech element identification information stored in association with the generated speech element specification information; and a speech synthesizing unit configured to receive speech element information from the server device and, based on the received speech element information, generate speech information obtained by converting text represented by the accepted text information into speech.

In this case, it is favorable that the speech element identification information is information representing an integer and is set so that, in a case that integers represented by the speech element identification information corresponding to the speech elements are arranged in the order of arrangement of the speech elements in the speech, the integers include a pair of two adjacent integers in which an integer at the end has a different value from a value obtained by adding 1 to an integer at the beginning.

In this case, it is favorable that the speech element identification information is set so that, in a case that the integers represented by the speech element identification information corresponding to the speech elements are arranged in the order of arrangement of the speech elements in the speech, the integers are arranged at random.

Further, a speech synthesis program product of another embodiment of the present invention is a program product comprising computer implementable instructions for causing a client device connected to a server device so as to be capable of communicating therewith, to realize: a text information accepting unit configured to accept text information representing text; a speech-element-identification-information transmitting unit configured to generate speech element identification information based on the accepted text information, and transmit, to the server device, speech element identification information stored in association with the generated speech element specification information in a storing device configured to store speech element identification information and speech element specification information, the speech element identification information being set so that, in a case that speech element information representing respective speech elements included in speech uttered by a speech registering user are arranged in the order of arrangement of the speech elements in the speech, at least one of speech element identification information identifying each of the speech element information has different information from information arranged in accordance with a predetermined rule, and the speech element specification information specifying a speech element; and a speech synthesizing unit configured to receive speech element information from the server device and, based on the received speech element information, generate speech information obtained by converting text represented by the accepted text information into speech.

In this case, it is favorable that the speech element identification information is information representing an integer and is set so that, in a case that integers represented by the speech element identification information corresponding to the speech elements are arranged in the order of arrangement of the speech elements in the speech, the integers include a pair of two adjacent integers in which an integer at the end has a different value from a value obtained by adding 1 to an integer at the beginning.

In this case, it is favorable that the speech element identification information is set so that, in a case that the integers represented by the speech element identification information corresponding to the speech elements are arranged in the order of arrangement of the speech elements in the speech, the integers are arranged at random.

An invention of a speech element providing device, a speech element providing method, a speech element providing program product, a speech synthesis method, a client device or a speech synthesis program product having the abovementioned configurations has similar actions to those of the abovementioned speech synthesis system, and therefore, can achieve the object of the present invention.

Although the present invention has been described above with reference to the respective embodiments, the present invention is not limited by the above-mentioned embodiments. The configuration and specification of the present invention can be altered within the scope of the present invention in various manners that can be understood by those skilled in the art.

For example, in the respective embodiments, the server device 20 stores speech element information and speech element identification information in association with each other so that, in a case that integers represented by speech element identification information corresponding to speech elements in speech uttered by a speech registering user are arranged in the order of arrangement of the speech elements, the integers are arranged at random.

In modified examples of the respective embodiments, the server device 20 may store speech element information and speech element identification information in association with each other so that, in a case that integers represented by speech element identification information corresponding to speech elements in speech are arranged in the order of arrangement of the speech elements, the integers include a pair of two adjacent integers in which the integer at the end has a different value from a value obtained by adding 1 to the integer at the beginning.

According to this, even if the client device 10 used by a fraudulent user transmits consecutive integers to the server device 20, it is possible to prevent the server device 20 from transmitting, to the client device, a portion including consecutive speech elements in speech uttered by a speech registering user. Therefore, it is possible to reduce a possibility that the portion including the consecutive speech elements in the speech uttered by the speech registering user is acquired by the fraudulent user.

Further, in the respective embodiments, speech element identification information is an integer, but may be a real number, or may be text. Moreover, in the respective embodiments, an integer represented by speech element identification information is an integer represented by a decimal number, but may be an integer represented by a base-N number (N represents a number other than 10).

Furthermore, in the respective embodiments, speech element information may be information that represents a speech element with a waveform, or may be information that represents a speech element with a parameter (for example, PARCOR (Partial Auto-correlation) Coefficient).

Further, in modified examples of the respective embodiments, speech element information may be composed of speech information representing speech uttered by a speech registering user and positional information representing the start position and end position of a speech element in the speech.

Furthermore, in the respective embodiments, speech element identification information stored in association with one speech element information is only one, but may be two or more.

Further, the respective embodiments are configured to accept text information inputted by a user, but may be configured to accept previously stored text information, or may be configured to accept text information received from another device.

The present invention is applicable to, for example, a speech synthesis system that executes a speech synthesis process by communication between a server device and a client device.

The invention claimed is:

1. A speech synthesis system comprising a server device and a client device connected so as to be capable of communicating with each other, wherein:
   the server device includes:
   a speech element information storing unit configured to store speech element information and speech element identification information in association with each other so that, in a case that speech element information representing respective speech elements included in speech uttered by a speech registering user are arranged in the order of arrangement of the speech elements in the speech, at least one of the speech element identification information identifying the respective speech element information has different information from information arranged in accordance with a predetermined rule;
   a speech-element-identification-information receiving unit configured to receive the speech element identification information from the client device; and
   a speech element information transmitting unit configured to transmit the speech element information stored in association with the received speech element identification information to the client device; and the client device includes:

a speech-element-identification-information storing unit configured to store speech element specification information specifying a speech element and the speech element identification information in association with each other;

a text information accepting unit configured to accept text information representing text;

a speech-element-identification-information transmitting unit configured to generate speech element specification information based on the accepted text information, and transmit speech element identification information stored in association with the generated speech element specification information, to the server device; and a speech synthesizing unit configured to receive speech element information from the server device and, based on the received speech element information, generate speech information obtained by converting text represented by the accepted text information into speech, wherein:

the speech element identification information is information representing an integer; and the speech element information storing unit is configured to store the speech element information and the speech element identification information in association with each other so that, in a case that integers represented by the speech element identification information corresponding to speech elements are arranged in the order of arrangement of the speech elements in the speech, the integers include a pair of two adjacent integers in which an integer at the end has a different value from a value obtained by adding 1 to an integer at the beginning.

2. The speech synthesis system according to claim 1, wherein the speech element information storing unit is configured to store the speech element information and the speech element identification information in association with each other so that, in a case that the integers represented by the speech element identification information corresponding to the speech elements are arranged in the order of arrangement of the speech elements in the speech, the integers are arranged at random.

3. The speech synthesis system according to claim 1, wherein the speech element information storing unit is configured to store the speech element information and the speech element identification information in association with each other so that an integer represented by speech element identification information corresponding to one of two similar speech elements becomes a value obtained by adding 1 to an integer represented by speech element identification information corresponding to the other of the two similar speech elements.

4. The speech synthesis system according to claim 1, wherein the server device includes an error-information output unit configured to, in a case that the speech element identification information received from the client device is not stored by the speech element information storing unit, output error information representing the fact.

5. A speech synthesis system comprising a server device and a client device connected so as to be capable of communicating with each other, wherein:

the server device includes:

a speech element information storing unit configured to store speech element information and speech element identification information in association with each other so that, in a case that speech element information representing respective speech elements included in speech uttered by a speech registering user are arranged in the order of arrangement of the speech elements in the speech, at least one of the speech element identification information identifying the respective speech element information has different information from information arranged in accordance with a predetermined rule;

a speech-element-identification-information receiving unit configured to receive the speech element identification information from the client device; and a speech element information transmitting unit configured to transmit the speech element information stored in association with the received speech element identification information to the client device; and the client device includes:

a speech-element-identification-information storing unit configured to store speech element specification information specifying a speech element and the speech element identification information in association with each other;

a text information accepting unit configured to accept text information representing text;

a speech-element-identification-information transmitting unit configured to generate speech element specification information based on the accepted text information, and transmit speech element identification information stored in association with the generated speech element specification information, to the server device; and a speech synthesizing unit configured to receive speech element information from the server device and, based on the received speech element information, generate speech information obtained by converting text represented by the accepted text information into speech, wherein the server device includes a communication blocking unit configured to block communication with the client device in a case that the speech element identification information received from the client device is not stored by the speech element information storing unit.

6. The speech synthesis system according to claim 1, wherein the speech element information storing unit is configured to store first speech element information of low sound quality and second speech element information of higher sound quality than the first speech element information, as the speech element information representing one speech element.

7. The speech synthesis system according to claim 6, wherein:

the client device includes:

a text information transmitting unit configured to transmit the accepted text information to the server device; and a speech information receiving unit configured to receive speech information transmitted from the server device; and the server device includes:

a text information receiving unit configured to receive the text information transmitted from the client device;

a speech synthesizing unit configured to generate speech information obtained by converting text represented by the received text information into speech based on the received text information and the stored second speech element information; and a speech information transmitting unit configured to transmit the generated speech information to the client device.

8. A speech element providing device, comprising:
a speech element information storing unit configured to store speech element information and speech element identification information in association with each other so that, in a case that speech element information representing respective speech elements included in speech uttered by a speech registering user are arranged in the order of arrangement of the speech elements in the speech, at least one of speech element identification information identifying the respective speech element information has different information from information arranged in accordance with a predetermined rule;
a speech-element-identification-information receiving unit configured to receive the speech element identification information; and
a speech element information transmitting unit configured to transmit the speech element information stored in a storing device in association with the received speech element identification information, wherein:
the speech element identification information is information representing an integer; and
the speech element information storing unit is configured to store the speech element information and the speech element identification information in association with each other so that, in a case that integers represented by the speech element identification information corresponding to the speech elements are arranged in the order of arrangement of the speech elements in the speech, the integers include a pair of two adjacent integers in which an integer at the end has a different value from a value obtained by adding 1 to an integer at the beginning.

9. The speech element providing device according to claim 8, wherein the speech element information storing unit is configured to store the speech element information and the speech element identification information in association with each other so that, in a case that the integers represented by the speech element identification information corresponding to the speech elements are arranged in the order of arrangement of the speech elements in the speech, the integers are arranged at random.

10. A speech element providing method, comprising:
causing a storing device to store speech element information and speech element identification information in association with each other so that, in a case that speech element information representing respective speech elements included in speech uttered by a speech registering user are arranged in the order of arrangement of the speech elements in the speech, at least one of speech element identification information identifying the respective speech element information has different information from information arranged in accordance with a predetermined rule;
receiving the speech element identification information; and
transmitting the speech element information stored in the storing device in association with the received speech element identification information, wherein the speech element identification information is information representing an integer,
the speech element providing method comprising, at the time of causing the storing device to store the speech element information and the speech element identification information in association with each other, causing the storing device to store the speech element information and the speech element identification information in association with each other so that, in a case that integers represented by the speech element identification information corresponding to the speech elements are arranged in the order of arrangement of the speech elements in the speech, the integers include a pair of two adjacent integers in which an integer at the end has a different value from a value obtained by adding 1 to an integer at the beginning.

11. The speech element providing method according to claim 10 comprising, at the time of causing the storing device to store the speech element information and the speech element identification information in association with each other, causing the storing device to store the speech element information and the speech element identification information in association with each other so that, in a case that the integers represented by the speech element identification information corresponding to the speech elements are arranged in the order of arrangement of the speech elements in the speech, the integers are arranged at random.

12. A non-transitory computer-readable medium storing a speech element providing program product comprising computer implementable instructions for causing a speech element providing device comprising a storing device, to realize:
a speech element-information storing process unit configured to cause the storing device to store speech element information and speech element identification information in association with each other so that, in a case that speech element information representing respective speech elements included in speech uttered by a speech registering user are arranged in the order of arrangement of the speech elements in the speech, at least one of speech element identification information identifying the respective speech element information has different information from information arranged in accordance with a predetermined rule;
a speech-element-identification-information receiving unit configured to receive the speech element identification information; and
a speech element information transmitting unit configured to transmit the speech element information stored in the storing device in association with the received speech element identification information, wherein:
the speech element identification information is information representing an integer; and
the speech element-information storing process unit is configured to cause the storing device to store the speech element information and the speech element identification information in association with each other so that, in a case that integers represented by the speech element identification information corresponding to the speech elements are arranged in the order of arrangement of the speech elements in the speech, the integers include a pair of two adjacent integers in which an integer at the end has a different value from a value obtained by adding 1 to an integer at the beginning.

13. The non-transitory computer-readable medium according to claim 12, wherein the speech element-information storing process unit is configured to cause the storing device to store the speech element information and the speech element identification information in association with each other so that, in a case that the integers represented by the speech element identification information corresponding to the speech elements are arranged in the order of arrangement of the speech elements in the speech, the integers are arranged at random.

14. A speech synthesis method applied to a speech synthesis system including a server device and a client device connected so as to be capable of communicating with each other, comprising:
- accepting text information representing text, by the client device;
- generating speech element specification information specifying a speech element, based on the accepted text information, by the client device;
- transmitting, to the server device by the client device, speech element identification information stored in association with the generated speech element specification information in a storing device configured to store speech element identification information identifying speech element information representing a speech element and speech element specification information specifying a speech element in association with each other, the storing device being included by the client device;
- receiving the speech element identification information from the client device, by the server device;
- transmitting, to the client device by the server device, speech element information stored in association with the received speech element identification information in a storing device configured to store speech element information and speech element identification information in association with each other so that, in a case that speech element information representing respective speech elements included in speech uttered by a speech registering user, at least one of the speech element identification information identifying the respective speech element information has different information from information arranged in accordance with a predetermined rule, the storing device being included by the server device; and
- receiving the speech element information from the server device and, based on the received speech element information, generate speech information obtained by converting text represented by the accepted text information into speech, by the client device, wherein the speech element identification information is information representing an integer,
- the speech synthesis method comprising, when causing the storing device to store the speech element information and the speech element identification information in association with each other, causing the storing device by the server device, to store the speech element information and the speech element identification information in association with each other so that, in a case that integers represented by the speech element identification information corresponding to the speech elements are arranged in the order of arrangement of the speech elements in the speech, the integers include a pair of two adjacent integers in which an integer at the end has a different value from a value obtained by adding 1 to an integer at the beginning.

15. The speech synthesis method according to claim 14, comprising, when causing the storing device to store the speech element information and the speech element identification information in association with each other, causing the storing device by the server device to store the speech element information and the speech element identification information in association with each other so that, in a case that the integers represented by the speech element identification information corresponding to the speech elements are arranged in the order of arrangement of the speech elements in the speech, the integers are arranged at random.

16. A client device connected to a server device so as to be capable of communicating therewith, the client device comprising:
- a speech-element-identification-information storing unit configured to store speech element identification information and speech element specification information in association with each other, the speech element identification information being set so that, in a case that speech element information representing respective speech elements included in speech uttered by a speech registering user are arranged in the order of arrangement of the speech elements in the speech, at least one of speech element identification information identifying the respective speech element information has different information from information arranged in accordance with a predetermined rule, and the speech element specification information specifying a speech element;
- a text information accepting unit configured to accept text information representing text;
- a speech-element-identification-information transmitting unit configured to generate speech element specification information based on the accepted text information and transmit, to the server device, the speech element identification information stored in association with the generated speech element specification information; and
- a speech synthesizing unit configured to receive speech element information from the server device and, based on the received speech element information, generate speech information obtained by converting text represented by the accepted text information into speech, wherein the speech element identification information is information representing an integer and is set so that, in a case that integers represented by the speech element identification information corresponding to the speech elements are arranged in the order of arrangement of the speech elements in the speech, the integers include a pair of two adjacent integers in which an integer at the end has a different value from a value obtained by adding 1 to an integer at the beginning.

17. The client device according to claim 16, wherein the speech element identification information is set so that, in a case that the integers represented by the speech element identification information corresponding to the speech elements are arranged in the order of arrangement of the speech elements in the speech, the integers are arranged at random.

18. A non-transitory computer-readable medium storing a speech synthesis program comprising computer implementable instructions for causing a client device connected to a server device so as to be capable of communicating therewith, to realize:
- a text information accepting unit configured to accept text information representing text;
- a speech-element-identification-information transmitting unit configured to generate speech element identification information based on the accepted text information, and transmit, to the server device, the speech element identification information stored in association with the generated speech element specification information in a storing device configured to store speech element identification information and speech element specification information, the speech element identification information being set so that, in a case that speech element information representing respective speech elements included in speech uttered by a speech registering user are arranged in the order of arrangement of the speech elements in the speech, at least one of speech element identification information identifying the respective speech element information has different information from information arranged in accordance with a predetermined rule, and the speech element specification information specifying a speech element; and a speech synthesizing unit configured to receive speech element information from the server device and, based on the received speech element information, generate speech information obtained by converting text represented by the accepted text information into speech, wherein the speech element identification information is information representing an integer and is set so that, in a case that integers represented by the speech element identification information corresponding to the speech elements are arranged in the order of arrangement of the speech elements in the speech, the integers include a pair of two adjacent integers in which an integer at the end has a different value from a value obtained by adding 1 to an integer at the beginning.

19. The non-transitory computer-readable medium according to claim 18, wherein the speech element identification information is set so that, in a case that the integers represented by the speech element identification information corresponding to the speech elements are arranged in the order of arrangement of the speech elements in the speech, the integers are arranged at random.

20. A speech synthesis system comprising a server device and a client device connected so as to be capable of communicating with each other, wherein:

the server device includes:

a speech element information storing means configured to store speech element information and speech element identification information in association with each other so that, in a case that speech element information representing respective speech elements included in speech uttered by a speech registering user are arranged in the order of arrangement of the speech elements in the speech, at least one of the speech element identification information identifying the respective speech element information has different information from information arranged in accordance with a predetermined rule;

a speech-element-identification-information receiving means configured to receive the speech element identification information from the client device; and a speech element information transmitting means configured to transmit the speech element information stored in association with the received speech element identification information to the client device; and the client device includes:

a speech-element-identification-information storing means configured to store speech element specification information specifying a speech element and the speech element identification information in association with each other;

a text information accepting means configured to accept text information representing text;

a speech-element-identification-information transmitting means configured to generate speech element specification information based on the accepted text information, and transmit speech element identification information stored in association with the generated speech element specification information, to the server device; and a speech synthesizing means configured to receive speech element information from the server device and, based on the received speech element information, generate speech information obtained by converting text represented by the accepted text information into speech, wherein:

the speech element identification information is information representing an integer; and the speech element information storing unit is configured to store the speech element information and the speech element identification information in association with each other so that, in a case that integers represented by the speech element identification information corresponding to speech elements are arranged in the order of arrangement of the speech elements in the speech, the integers include a pair of two adjacent integers in which an integer at the end has a different value from a value obtained by adding 1 to an integer at the beginning.

21. A speech element providing device, comprising:

a speech element information storing means configured to store speech element information and speech element identification information in association with each other so that, in a case that speech element information representing respective speech elements included in speech uttered by a speech registering user are arranged in the order of arrangement of the speech elements in the speech, at least one of speech element identification information identifying the respective speech element information has different information from information arranged in accordance with a predetermined rule;

a speech-element-identification-information receiving means configured to receive the speech element identification information; and a speech element information transmitting means configured to transmit the speech element information stored in a storing device in association with the received speech element identification information, wherein:

the speech element identification information is information representing an integer; and the speech element information storing unit is configured to store the speech element information and the speech element identification information in association with each other so that, in a case that integers represented by the speech element identification information corresponding to the speech elements are arranged in the order of arrangement of the speech elements in the speech, the integers include a pair of two adjacent integers in which an integer at the end has a different value from a value obtained by adding 1 to an integer at the beginning.

22. A client device connected to a server device so as to be capable of communicating therewith, the client device comprising:

a speech-element-identification-information storing means configured to store speech element identification information and speech element specification information in association with each other, the speech element identification information being set so that, in a case that speech element information representing respective speech elements included in speech uttered by a speech registering user are arranged in the order of arrangement of the speech elements in the speech, at least one of speech element identification information identifying the respective speech element information has different information from information arranged in accordance with a predetermined rule, and the speech element specification information specifying a speech element;

a text information accepting means configured to accept text information representing text;

a speech-element-identification-information transmitting means configured to generate speech element specification information based on the accepted text information and transmit, to the server device, the speech element identification information stored in association with the generated speech element specification information; and a speech synthesizing means configured to receive speech element information from the server device and, based on the received speech element information, generate speech information obtained by converting text represented by the accepted text information into speech, wherein the speech element identification information is information representing an integer and is set so that, in a case that integers represented by the speech element identification information corresponding to the speech elements are arranged in the order of arrangement of the speech elements in the speech, the integers include a pair of two adjacent integers in which an integer at the end has a different value from a value obtained by adding 1 to an integer at the beginning.

* * * * *